MAGNETIC AMPLIFIER

Filed May 24, 1954 5 Sheets-Sheet 1

INVENTORS.
JOSEPH A. FINGERETT
BY FRANK A. HILL
ATTORNEY

INVENTORS
JOSEPH A. FINGERETT
BY FRANK A. HILL
Theodore H. Lassagne
ATTORNEY

INVENTORS
JOSEPH A. FINGERETT
BY FRANK A. HILL
ATTORNEY

INVENTORS
JOSEPH A. FINGERETT
BY FRANK A. HILL
ATTORNEY

INVENTORS
JOSEPH A. FINGERETT
BY FRANK A. HILL
ATTORNEY

United States Patent Office 2,777,073

Patented Jan. 8, 1957

2,777,073

MAGNETIC AMPLIFIER

Joseph A. Fingerett, Pacoima, and Frank A. Hill, Van Nuys, Calif., assignors to Librascope, Incorporated, Glendale, Calif., a corporation of California

Application May 24, 1954, Serial No. 431,839

19 Claims. (Cl. 307—17)

Figure 1:
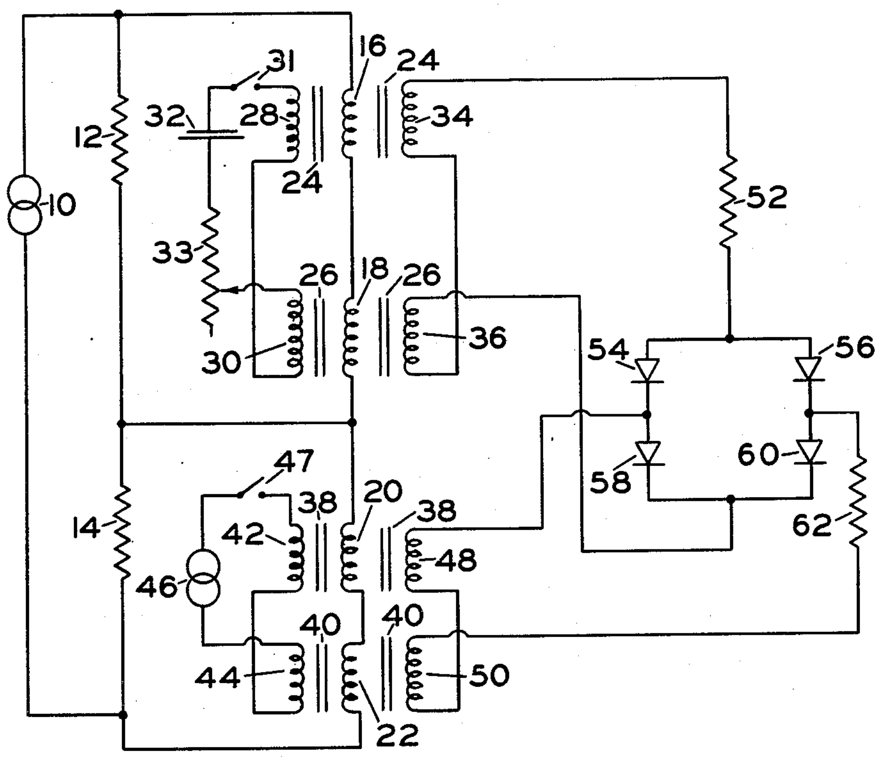

This invention relates to magnetic amplifiers and more particularly to magnetic amplifiers which provide an improved power efficiency over amplifiers now in use and which cannot draw excessive current from the power source even with considerable variations in line voltage. The invention is especially adapted to be used with ultra-fast magnetic amplifiers where an output pulse is produced in each half cycle of line voltage in response to a signal pulse occurring within the same half cycle. The invention also relates to a method of preventing magnetic amplifiers from becoming excessively heated even with considerable variations in line voltage.

In certain fields of technology, a fast and sensitive response to electrical signals is required. For example, the response of an automatically aimed gun or cannon to such signals must be very quick and sensitive, especially when the target is itself moving in an elusive path. Servomechanisms have been devised to perform such work. As a part of such servomechanisms, means are employed to amplify a relatively weak output signal so that a relatively strong signal can be employed to control the operation of successive components of the system and finally the gun itself.

One type of amplifier which has been employed operates on magnetic priciples. In such amplifiers, saturable cores are paired and input signals are applied to the pairs of cores to produce a separation in the time that the cores in a pair become saturated. An output signal is produced after one of the cores in a pair has become saturated and until the other core in the pair becomes saturated.

Until recently, one serious limitation in magnetic amplifiers resulted from the inability of such amplifiers to produce an output signal in each half cycle of line voltage in accordance with a signal input exclusively within the same half cycle. In their optimum operation, such amplifiers produced an output signal in a second half cycle of voltage in response to an input signal which occurred during the first half cycle of voltage.

In co-pending application Serial No. 412,796, filed February 26, 1954, by Joseph A. Fingerett and Frank A. Hill, an ultra-fast magnetic amplifier is disclosed and claimed which produces an output pulse in each half cycle of line voltage in response to a signal pulse within the same half cycle. Magnetic amplifiers are also disclosed for producing output pulses of either polarity during any half cycle of line voltage in response to input signals of either polarity which are introduced to the amplifier to produce a separation in the times that the cores in each pair saturate. The response time of such ultra-fast magnetic amplifiers is so fast that a plurality of amplifier stages can be cascaded and the last stage is still able to produce an output pulse in the same half cycle of line voltage as the input signal introduced to the first stage.

The present invention also provides a magnetic amplifier which operates to produce an output signal in each half cycle of line voltage in accordance with the polarity of the input signal and in the same half cycle as the input signal. In addition to this feature, the amplifier includes self-regulating features which prevent the source of line voltage from becoming overloaded even with considerable variations in the amplitude and frequency of the line voltage. For example, the line voltage may vary as much as 15 volts above or 15 volts below a normal value of 115 volts without any overloading of the voltage source. Such elimination of overloading is important in preventing excessive heating of the amplifier and the voltage source and in maintaining its optimum operation, i. e., complete saturation of certain cores within each half cycle and very near the end of each half cycle of line voltage.

The embodiment of the invention disclosed herein includes a first half pair of saturable cores forming a main amplifier and a second pair of saturable cores forming a switching amplifier. Line windings are wound on the cores in the switching amplifier and in the main amplifier for the introduction of line voltage from a source. In addition to the line windings on the cores, input windings are disposed on the cores in the main amplifier and are differentially connected to produce magnetic fluxes of opposite polarities in their cores. Pairs of differentially connected output windings are also disposed on the cores in the main amplifier and in the switching amplifier. An output circuit including rectifiers and a load is connected to the output windings in the main and switching amplifiers.

The cores in each pair are so associated with the windings on the cores that one of the cores in the switching amplifier saturates first when a line voltage is introduced to the magnetic amplifier. After the core in the switching amplifier has saturated, both cores in the main amplifier saturate simultaneously when no input signal is introduced to the input windings in the main amplifier, and the cores saturate at different times upon the introduction of an input signal to the input windings. An output signal is produced across the load during the time in each half cycle of line voltage when one of the cores in the main amplifier becomes saturated and until the time that the other core in the amplifier becomes saturated.

As disclosed above, one of the cores in the switching amplifier and at least one of the cores in the main amplifier become saturated towards the end of each half cycle of line voltage. Subsequently in the half cycle, current flows through the output winding disposed on the unsaturated core in the switching amplifier. This current is in a direction to prevent the core from becoming saturated. Since the core remains unsaturated, it presents a high impedance to the line voltage and limits the current flowing from the source of line voltage through the line windings. In this way, the source of line voltage cannot become overloaded even with considerable variations in the amplitude and frequency of the line voltage, and the voltage source and amplifier cannot become excessively heated. Thus, the two cores in the switching amplifier not only perform a switching function but also a regulating function in preventing the source of line voltage from becoming overloaded.

An object is to provide a magnetic amplifier for maintaining a substantially optimum operation even with considerable variations in the amplitude and frequency of a line voltage and for producing a desirable output signal even with such variations in the line voltage.

Another object is to provide a magnetic amplifier of the above character having self-regulating features for preventing the amplifier and the source of line voltage from becoming overloaded and excessively heated even with considerable variations in the amplitude and frequency of the line voltage.

A further object is to provide a magnetic amplifier of the above character in which the self-regulating features operate to insure that an output pulse is produced in each half cycle of line voltage regardless of considerable variations in the amplitude of the line voltage and in the same half cycle as that in which the input signal is introduced.

Still another object is to provide a magnetic amplifier of the above character including means for reducing power dissipation in the magnetic amplifier and in the line to a minimum, especially when no signal is introduced to the amplifier for amplification.

A still further object is to provide a magnetic amplifier of the above character for increasing the operating efficiency of the amplifier so that an output pulse of optimum amplitude can be produced by the amplifier upon the introduction of an input signal.

Another object is to provide a magnetic amplifier of the above character requiring a minimum number of components to obtain the advantages disclosed above.

A further object is to provide a magnetic amplifier of the above character in which adjustments can be made in the amplitude of output signal and in the relative time during each half cycle in which the output signal is produced.

Still another object is to provide a method of regulating the operation of a magnetic amplifier to prevent a source of line voltage and the amplifier from becoming overloaded and excessively heated even with considerable variations in the amplitude and frequency of a line voltage.

Other objects and advantages will be apparent from a detailed description of the invention and from the appended drawings and claims.

Figure 6:
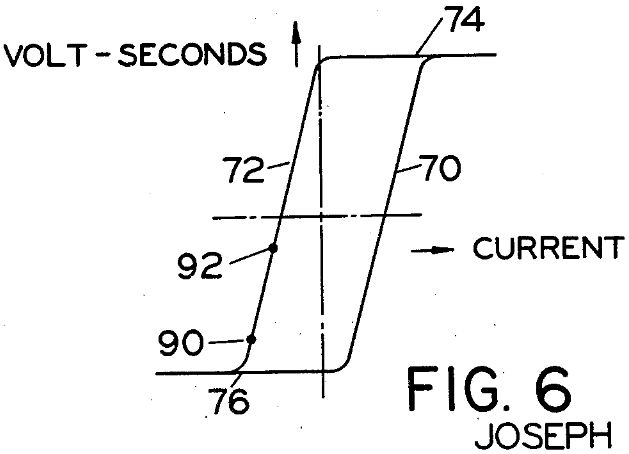
Figure 2:
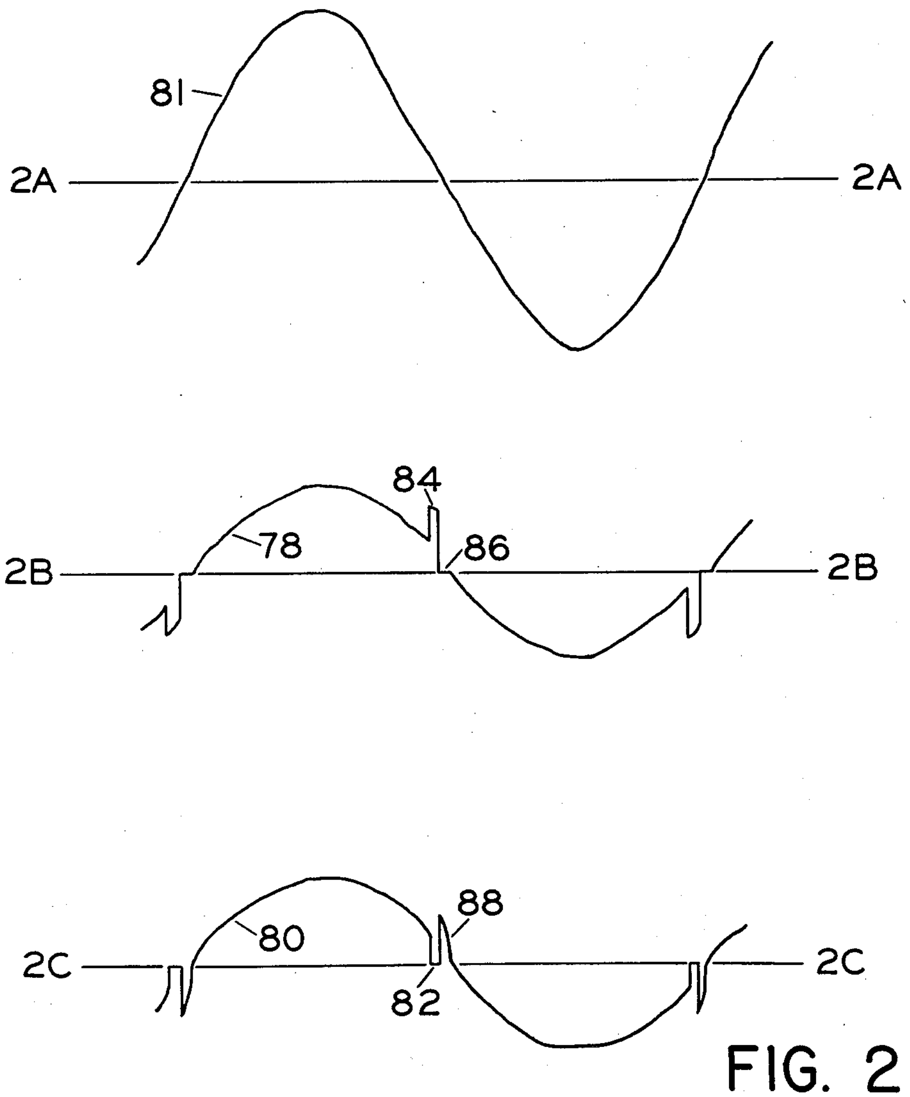
Figure 3:
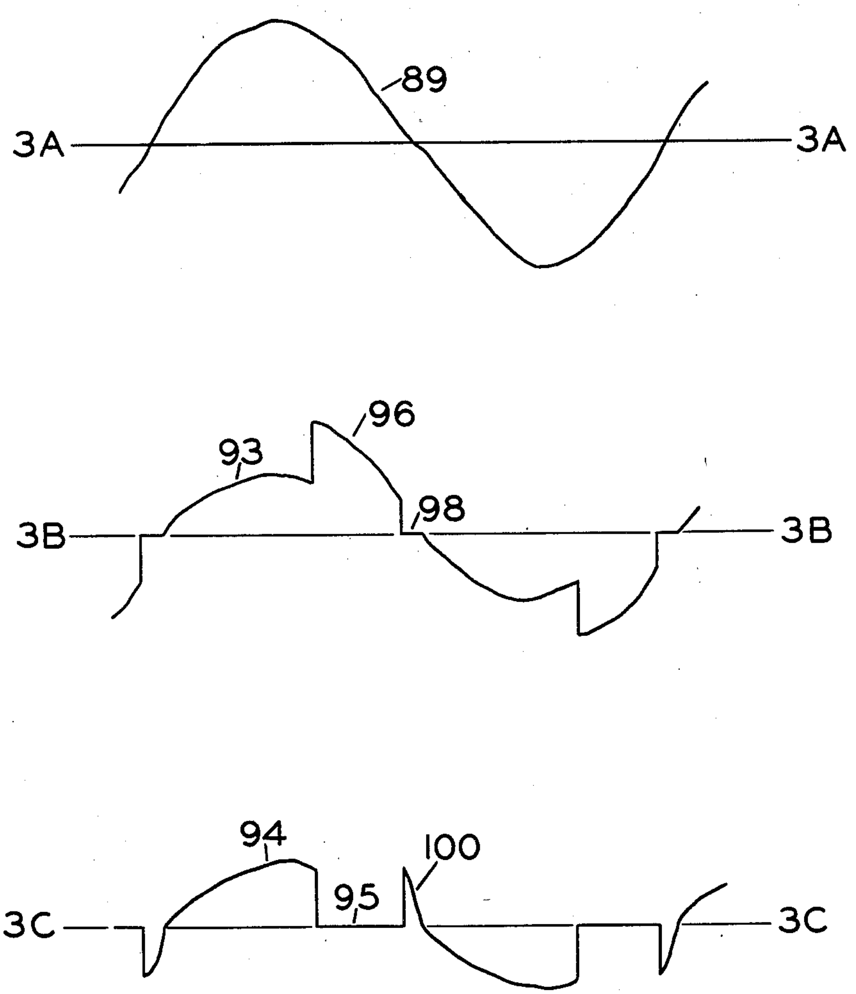

In the drawings:

Figure 1 is a circuit diagram illustrating one embodiment of a magnetic amplifier constituting this invention;

Figures 2A to 2C, inclusive, are representative curves illustrating voltage waveforms at strategic terminals in the amplifier shown in Figure 1 when a relatively high line voltage and no signal voltage are introduced to the amplifier;

Figures 3A to 3C, inclusive, are representative curves illustrating voltage waveforms at the strategic terminals upon the introduction of a relatively low line voltage and no signal voltage;

Figures 4A to 4D, inclusive, are representative curves illustrating voltage waveforms at the strategic terminals for the case where a relatively high line voltage and a relatively large signal voltage are introduced to the amplifier;

Figures 5A to 5D, inclusive, are representative curves illustrating voltage waveforms at the strategic terminals when a relatively low line voltage and a relatively high signal voltage are introduced to the amplifier; and Figure 6 is a hysteresis loop for a typical wound core as used in the magnetic amplifier shown in Figure 1.

In the illustrated embodiment of the invention, a source of alternating line voltage 10 (Figure 1) is provided. As will be disclosed in detail hereinafter, the line voltage ordinarily has a value of 115 volts and a frequency of 60 cycles. One object of the present invention is to maintain ultra-fast and efficient operation over a wide range of supply voltage variations. For example, with a frequency of 60 cycles, the voltage may increase to a value as high as 130 volts and may decrease to a value of 100 volts or less. Or, when the voltage remains at 115 volts, the frequency may vary between 52 and 68 cycles. Or the voltage and frequency may both vary from their mean values to produce total variations of ±13% or more.

Resistances 12 and 14 having values of approximately 55,000 and 45,000 ohms, respectively, are connected in series with the voltage source 10. The particular values chosen for the resistances and the function of the resistances will be disclosed in detail subsequently. A pair of line windings 16 and 18 which are the line windings of the switching magnetic amplifier are in series across the resistance 12. A pair of line windings 20 and 22 which are the line windings of the main magnetic amplifier are in series across the resistance 14.

As a particular example, the windings 16 and 18 may each be formed from 600 turns of No. 23 wire. The windings 16 and 18 are respectively wound on cores 24 and 26 having saturable magnetic properties. The windings 16 and 18 may be wound separately on the cores 24 and 26 or the cores may be stacked and each of the windings may be wound around both cores. By way of illustration, each of the cores 24 and 26 may be toroidal in shape and may have an inner diameter of approximately 2 inches, an outer diameter of approximately 2½ inches and a height of approximately 1 inch.

The cores 24 and 26 may be made from material manufactured by Magnetics, Inc. of Butler, Pennsylvania, and designated as "Orthonol" by that company. The particular cores used may be purchased from Magnetics, Inc. by their trade number 50041-4A. The core material is composed of approximately 50% nickel and 50% iron and is made from material which is rolled only in a particular direction and which is annealed in hydrogen to grain orient the material.

Input windings 28 and 30 are shown as being wound on the cores 24 and 26, respectively. The windings are shown as being differentially connected to a source of direct voltage, such as a battery 32 through a manually operated switch 31 and a rheostat 33. Because of such differential connections, the winding 28 produces magnetic flux in one direction in the core 24 and the winding 30 produces magnetic flux in the opposite direction in the core 26. The windings 28 and 30, the switch 31, the battery 32 and the rheostat 33 need not actually be included in the magnetic amplifier shown in Figure 1, for reasons hereinafter explained.

A pair of output windings 34 and 36 are also respectively wound on the cores 24 and 26. Each of the windings 34 and 36 may be wound around both of the cores 24 and 26 in the stacked relationship of the cores if the windings 16 and 18 are not so wound. Otherwise, the winding 34 is usually individually wound around the core 24, and the winding 36 is usually individually wound around the core 26. By way of illustration, each of the windings 34 and 36 may be formed from approximately 2,600 turns of No. 26 wire.

The line windings 20 and 22 are respectively wound on cores 38 and 40 (main magnetic amplifier cores) corresponding in composition and construction to the cores 24 and 26. As an example, each of the windings 20 and 22 may be formed from approximately 462 turns of No. 22 wire. Each of the windings may be wrapped individually about its associated core or it may be wrapped about both of the cores 38 and 40 in the stacked realtionship of the cores.

Input windings 42 and 44 are wound on the cores 38 and 40, respectively. Each of the windings 42 and 44 may be formed from approximately 150 turns of No. 26 wire. The windings 42 and 44 are connected in series with a source 46 of signal energy and a manually operated switch 47 to introduced energy differentially to the cores 38 and 40. In other words, the winding 42 introduces energy of one polarity from the source 46 to the core 38 and the winding 44 introduces energy of opposite polarity to the core 40.

The cores 38 and 40 also have output windings 48 and 50 wrapped around them. Each of the windings 48 and 50 may be formed from approximately 2,000 turns of No. 26 wire. The windings 48 and 50 and the windings 42 and 44 may be wound around both of the cores 38 and 40 when the windings 20 and 22 are individually wound on their associated cores. Otherwise, the windings 42 and 44 and the windings 48 and 50 are individually wrapped around their associated cores.

The lower terminal of the winding 34 in Figure 1 is connected to the lower terminal of the winding 36. Because of such an interconnection, the windings 34 and 36 are differentially responsive such that the winding 34 produces magnetic flux in an opposite direction to that produced by the winding 36. A connection is made from the upper terminal of the winding 34 to one terminal of a dummy load 52 having a relatively low impedance. For example, the dummy load 52 may be a resistance having a value of approximately 1,000 ohms.

The other terminal of the dummy load 52 is connected to the plates of two diodes 54 and 56. The cathodes of the diodes 54 and 56, respectively have common terminals with the plates of diodes 58 and 60. The cathodes of the diodes 58 and 60 are in turn connected to the upper terminal of the winding 36 as seen in Figure 1. The diodes 54, 56, 58 and 60 may each be four series-connected germanium diodes as manufactured by the General Electric Company and other suppliers and as described in a bulletin published June 1953, by General Electric. The diodes may be identified by the General Electric type number of "IN93."

The lower terminals of the windings 48 and 50 are connected together in a manner similar to that disclosed above for the windings 34 and 36. In this way, the windings 48 and 50 operate differentially to produce magnetic fluxes in opposite directions in their respective cores 38 and 40. Connections are made from the upper terminal of the winding 48 to the plate of the diode 58 and from the upper terminal of the winding 50 to one terminal of a load 62 having a relatively low impedance. The other terminal of the load 62 is connected to the plate of the diode 60. By way of illustration, the load 62 may be a resistance having a value of approximately 1,000 ohms. Actually, the load may be an electrical motor or other suitable means for utilizing the amplified signal.

It is well known that magnetic cores produce a changing magnetic flux when a voltage is applied to a winding supported on the core. If a voltage is applied to the winding for a sufficient period of time, the core may become magnetically saturated. The core becomes negatively magnetically saturated when a voltage of a first polarity is applied to the winding on the core for a particular period of time. The core becomes positively saturated when the same voltage of the opposite polarity is applied to the winding for the same length of time.

During the time that a core is not saturated, it produces increased amounts of magnetic flux, as a voltage of one polarity is applied. For certain core materials such as that used in the cores of this embodiment, small increases in current may cause large increases in the rate of change of magnetic flux. Since increases in rate of change of flux are equivalent to electromotive force—in other words, voltage—a large increase in voltage can be produced by a small increase in current (incremental magnetizing current) when the core remains unsaturated. This may be seen by the steep sides of the curve shown in Figure 6, such sides being designated as 70 and 72. Because of the large increase in voltage required to produce a small increase in current, the impedance presented by the winding may be relatively large during periods of core unsaturation. For example, each of the output windings 34, 36, 48 and 50 may have impedances of approximately 100,000 ohms when their associated cores remain unsaturated.

When a core becomes magnetically saturated, increases in current through its associated winding produce substantially no increase in magnetic flux. Because of the lack of any increase in flux in the core, no voltage is induced in the winding. This may be seen by the horizontally flat portions 74 and 76 in the hysteresis loop shown in Figure 6. Since impedance is represented by the ratio between the voltage and the current, the winding has substantially zero impedance when its associated core becomes saturated. For example, the winding 36 presents a very low impedance when the core 26 becomes saturated.

The performance of a magnetic core at any instant is dependent upon certain characteristics of the core. For example, the performance of the core is dependent, among other factors, upon the cross-sectional area of the core and the magnetic material from which it is made. The characteristics of the core in turn determine how long a period of time is required to change the core from a negative saturation to a positive saturation or vice versa when a particular voltage is imposed on the winding associated with the core. Increases in voltage result in a decrease in the time required to change the polarity of core saturation. Similarly, increased periods of time are required to saturate a core for decreases in voltage applied to the associated winding.

The combination of voltage and time required to convert a core from one polarity of saturation to the opposite polarity of saturation has been defined as the "volt-seconds capacity" of the core. The term "volt-seconds" can be mathematically described as the integral of voltage with respect to time. Thus, $$\text{Volt-seconds} = \int_0^t V\,dt$$

where $V$=the voltage at any instant; and $dt$=an infinitesimal increase in time from that instant.

Since the volt-seconds level of a core at any instant is dependent upon the value of the volt-seconds which have been applied through an associated winding previous to that instant, the curve shown in Figure 6 represents the relationship between current and volt-seconds. The value of the current is represented along the horizontal axis and the amount of volt-seconds is represented along the vertical axis. As will be seen in Figure 6, the portions 70 and 72 are relatively steep and the portions 74 and 76 are relatively flat such that a response curve approaching a rectangle is produced. Such a response curve is desirable for reasons which will become apparent in the subsequent discussion.

During alternate half cycles, the source 10 of Figure 1 has a positive voltage on its upper terminal and a negative voltage on its lower terminal, such a voltage relationship being hereinafter referred to as a positive half cycle. During such periods, magnetizing current flows downwardly through the windings 16, 18, 20 and 22. This magnetizing current is relatively small and produces in the cores 24, 26, 38 and 40 magnetic fluxes in a downwardly direction. These magnetic fluxes move the volt-second level of the cores in a downward direction on the hysteresis loop shown in Figure 6.

If a voltage should be applied by the battery 32 to the windings 30 and 28 through the rheostat 33 as shown, current would flow downwardly through the winding 30 and upwardly through the winding 28. The current through the winding 30 would cause the winding to produce a magnetic flux in the core 26 in the same direction as that produced by the winding 18. However, because of the differential action of the windings 28 and 30, the winding 28 would produce a magnetic flux in the core 24 in the opposite direction to that produced by the winding 16. The resultant rate of change of flux in the core 26 would thus be greater than the rate of change of flux in the core 24.

Since the core 26 has a greater rate of change of flux at any instant than the core 24, a greater voltage is instantaneously applied by the source 10 to the winding 18 than to the winding 16. The application of a greater voltage to the winding 18 than to the winding 16 causes the core 26 to become saturated before the core 24 since the core 26 receives a greater amount of volt-seconds per unit of time than the core 24.

Since the line winding 18 has a greater voltage than the line winding 16, the output winding 36 has a greater voltage than the output winding 34. This results in voltage being applied to the rectifiers 54, 56, 58 and 60 in the back or non-conducting direction. Consequently, the voltage source 32 must only supply incremental magnetizing current to the cores 24 and 26 and low back current to the rectifiers.

As disclosed above, only magnetizing current initially flows through the windings 16, 18, 20 and 22. This magnetizing current is relatively small since the cores 24, 26, 38 and 40 are unsaturated and the cores are operating in the region 72 of Figures 6. During this time, the voltage across the windings 20 and 22 is of the same order of magnitude as the voltage across the windings 16 and 18. This results from the fact that the resistances 12 and 14 have values of the same order of magnitude, thereby causing a voltage to be produced across the resistance 12 of the same order of magnitude as the voltage across the resistance 14. The voltage produced across the windings 16 and 18 is illustrated at 80 in Figure 2C and the voltage across the windings 20 and 22 is illustrated at 78 in Figure 2B. These voltages are produced as a result of the application of a substantially sinusoidal voltage from the source 10, as illustrated at 81 in Figure 2A.

When the core 26 becomes saturated, substantially no voltage is produced across the winding 18. This results from the fact that the core 26 is operating in the substantially flat portion (Figure 6) of its response curve and causes a negligible impedance to be produced in the winding 18. Since no voltage is produced in the winding 18, the voltage from the source 10 must be redistributed in the windings 16, 20 and 22.

On first thought, it would appear that a voltage would be produced across the winding 16 of the same order of magnitude as the voltage across the windings 20 and 22 when the core 26 becomes saturated. It would appear that this voltage relationship would occur because of the values of the resistances 12 and 14. However, if any voltage of the polarity normally produced by the source 10 were to appear across the line winding 16 and hence the output winding 34, a very large current would flow through the resistor 52 and the rectifiers 54, 56, 58 and 60 in the forward direction of the rectifiers—in other words, the direction of low rectifier impedance. This current from the output winding 34 would necessitate an equivalent current through the line winding 16 as a result of normal transformer action. However, the current through the line winding 16 would also have to flow through line windings 18, 20 and 22.

Since no load current can flow through the windings 20 and 22 when they are unsaturated, only magnetizing current can flow through the winding 16. The impedance presented by the winding 16 to the magnetizing current is relatively low since a relatively low impedance is presented to the winding by the circuit including the output windings 34 and 36, the load 52 and the diodes. Because of the relatively low impedance presented to the winding 16 and the relatively small current through the winding, practically no voltage is produced across the winding. This is illustrated at 82 in Figure 2C. This causes the full voltage from the source 10 to be applied across the windings 20 and 22, as illustrated at 84 in Figure 2B.

The application of the full line voltage across the windings 20 and 22 causes a considerable amount of volt-seconds to be fed into the cores 38 and 40 such that the cores become saturated relatively quickly. In the absence of a signal current, the cores 38 and 40 become saturated at substantially the same instant since they have similar volt-second capacities and the same amount of volt-seconds are fed into the cores. When the cores become saturated, the impedances presented to the windings 20 and 22 become relatively low and the voltages produced across the windings become negligible. This is illustrated at 86 in Figure 2B.

Upon the saturation of the cores 38 and 40, the core 24 is the only core remaining unsaturated. This causes the full line voltage from the source 10 to be impressed across the winding 16, as illustrated at 88 in Figure 2C. The large voltage across the winding 16 in turn causes a load current to flow through the circuit including the dummy load 52, the diodes and the windings 34 and 36. This current is relatively large because of the low impedance presented by the dummy load 52 and the diodes.

The voltage producing the flow of current through the dummy load 52 has a positive polarity at the upper terminal of the winding 34 and an opposite polarity at the lower terminal of the winding. As will be seen, however, the battery 32 produces a more positive polarity at the lower terminal of the winding 28 than at the upper terminal of the winding. This causes volt-seconds to be produced by the flow of current through the dummy load 52 in an opposite direction to the volt-seconds produced by the battery 32. Thus, the flow of current through the dummy load 52 provides a stabilizing action in maintaining the operation of the amplifier as disclosed above.

The above discussion relates to the operation of the magnetic amplifier when a positive voltage is applied from the source 10 to the winding 16 and when no signal is produced by the source 46. However, the amplifier operates in a similar manner upon the application of a positive voltage from the source 10 to the winding 22 (hereinafter defined as a negative half cycle) and the application of no voltage from the source 46. Under such a set of conditions, current flows upwardly through the windings 22, 20, 18 and 16. This current produces flux in the core 24 in the same direction as the flux produced in the core by the flow of current from the battery 32. The flux produced in the core 26 by the application of voltage from the source 10 opposes the flux produced in the core by the application of voltage from the battery 32. This causes the core 24 to become saturated before the core 26.

When the core 24 becomes saturated, the full voltage from the source 10 is applied across the windings 22 and 20. This voltage causes the cores 38 and 40 to become simultaneously saturated and the full line voltage to be subsequently impressed across the winding 18. Since the lower terminal of the winding 18 has a more positive voltage impressed upon it than the upper terminal of the winding, the voltage induced in the winding 36 is more positive at the lower terminal than at the upper terminal. This voltage is in a direction to produce a flow of current through the dummy load 52 and the diodes in a manner similar to that disclosed above. Thus, the magnetic amplifier operates in a similar manner during both halves of each voltage cycle from the source 10.

The characteristics of the magnetic amplifier are chosen so that the amplifier will operate in a manner similar to that illustrated in Figures 2A to 2C, inclusive, when a maximum voltage such as 130 volts is produced by the source 10 and when no signal is produced by the source 46. As will be seen in Figure 2C, the core 26 saturates relatively late in the first half cycle and in alternate half cycles thereafter and the core 24 saturates relatively late in the second half cycle and in alternate half cycles thereafter.

The saturation of either the core 24 or the core 26 at a relatively late time in each half cycle causes the full line voltage from the source 10 to be applied to the windings 20 and 22 for only a relatively short time in each half cycle before the cores 38 and 40 saturate. This is seen by the relatively short duration of the curve portion 84 in Figure 2B. Since the cores 38 and 40 become saturated at almost the end of each half cycle, the full line voltage is only applied in alternate half cycles across the winding 18 for relatively short periods of time, as illustrated at 88 in Figure 2C. Similarly, the full line voltage is applied to the winding 16 for only a relatively short period of time in alternate half cycles of voltage. Because of this, the volt-seconds produced in the windings 16 and 18 by the current flowing through the dummy load 52 is relatively low.

As has been previously disclosed, the line voltage from the source 10 may vary considerably. For example, before work is commenced in factories in the morning, the voltage may be relatively high since not much power is being consumed. Late in the day, the voltage may decrease considerably since not only factories are consuming considerable power but people require electricity to light their homes. Thus, the voltage from the source 10 may vary from as high a value as 130 volts to as low a value as 100 volts. The low line voltage from the source 10 is illustrated at 89 in Figure 3A.

When the line voltage from the source 10 is relatively high, each of the switching magnetic amplifier cores 24 and 26 receives a considerable amount of volt-seconds. The core remaining unsaturated at the end of each half cycle receives a considerable amount of volt-seconds during the half cycle. This causes the unsaturated core to be at a position approaching saturation in the hysteresis loop shown in Figure 6. For example, the core 24 would have a volt-second level corresponding to the position 90 in Figure 6 at the end of each positive half cycle (i. e., upper terminal of source 10 is positive). As will be seen, the position 90 is not far from the flat portion 76 representing the negative saturation of the core 26 at such times.

Upon a decrease in the voltage applied to the windings from the source 10, the volt-seconds applied to the cores 24 and 26 decrease. As will be disclosed in detail hereinafter, the volt-seconds are still sufficient to produce a saturation of one of the cores 24 and 26 and of both cores 38 and 40 during each half cycle when no signal is applied from the source 46. However, the core remaining unsaturated is not as close to saturation as it is when the line voltage is high. For example, the core 24 would have a volt-seconds level corresponding only to the position 92 in Figure 6 at the end of alternate half cycles (i. e., positive voltage from the source 10) when the line voltage is only 100 volts. As will be seen, the position 92 is much further away than the position 90 from the negative saturation represented by the flat portion 76.

A reduction in the line voltage from the source 10 causes the Barkhausen effect to become temporarily predominant in the operation of the magnetic amplifier when the source 32 is not present. The Barkhausen effect relates to the phenomenon that cores do not always operate in the same way at different times. For example, the molecules in the core may not be magnetically aligned as well at one instant under a particular set of conditions as at another instant under the same set of conditions. This causes the flux produced by the core to be less at one instant than at the other. As will be seen, each core has a random voltage variation from a norm in accordance with the Barkhausen effect.

The Barkhausen effect will now be considered in relation to the pair of switching cores 24 and 26. The effect will also be considered in positive half cycles when current flows downwardly through the windings 16, 18, 20 and 22 as a result of a positive voltage on the upper terminal of the source 10. Under these conditions, the Barkhausen effect produces a random distribution of voltage between the windings 16 and 18 and consequently between the windings 34 and 36. Since the windings 34 and 36 are connected differentially, the voltage across these windings in series tends to fluctuate from positive to negative rapidly in a random manner.

If the random differential voltage produced by the Barkhausen effect were positive (upper terminal of winding 34 positive), it would produce a flow of current through the dummy load 52, the diodes and winding 36. This current would flow upwardly through the winding 34 and downwardly through the winding 36 in a direction to produce flux in opposition to that resulting from the Barkhausen effect. As a result, the Barkhausen effect can never build up to an appreciable differential voltage of positive polarity. However, a negative differential voltage as a result of the Barkhausen effect will only generate low current because of the high impedance presented by the diodes 54, 56, 58 and 60. Therefore, negative differential volt-seconds can accumulate.

As a result of the Barkhausen effect, the core 24 at the end of positive half cycles of line voltages changes from the position 90 to the position 92 in Figure 6 when the line voltage decreases. Since the core 24 has a volt-second level corresponding to the position 92 at the end of positive half cycles for low line voltages, it has only to travel from the position 92 to the flat portion 74 in the subsequent half cycles to become positively saturated. As a result, the core 24 requires less volt-seconds to become saturated upon the imposition of low line voltages than upon the imposition of high line voltages. This causes the core 24 to become saturated earlier in the negative half cycle for low line voltages than for high line voltages. This may be seen by comparing the duration of curve portions 93 and 94 in Figures 3B and 3C with the duration of the corresponding curve portions 78 and 80 in Figures 2B and 2C. Similarly, the core 26 becomes saturated relatively early in positive half cycles.

Upon the saturation of the core 26 in positive half cycles, substantially no voltage is produced across the winding 18. For the same reasons as disclosed above in the discussion of high line voltages, the voltage across the windings 16 and 18 have a negligible value, as illustrated at 95 in Figure 3C. When the windings 16 and 18 have a negligible voltage, the windings 20 and 22 have the full line voltage imposed across them, as illustrated at 96 in Figure 3B.

Because of the low line voltage, the cores 38 and 40 require a longer time to become saturated after they receive the full line voltage than in the case where the line voltage is high. This is illustrated by the relatively long duration of the curve portion 96 in Figure 3B. Both of the cores 38 and 40 become saturated at the same time since they both have similar characteristics and receive the same amount of volt-seconds.

The saturation of the cores 38 and 40 causes the voltage across the windings 20 and 22 to drop to a negligible value, as illustrated at 98 in Figure 3B. When this occurs, the full line voltage is applied across the winding 16. This is illustrated at 100 in Figure 3C. The resultant flow of current through the dummy load 52 and the diodes is in a direction to stabilize the operation of the magnetic amplifier, as fully disclosed above. Thus, one of the cores 24 and 26 remains unsaturated during each half cycle of line voltage even when the line voltage drops to a relatively low value such as 100 volts.

The operation of the magnetic amplifier as disclosed above has proceeded on the basis of no signal from the source 46. It has been shown by such disclosure that the magnetic amplifier can never draw excessively large currents from the source 10, even with considerable variations in line voltage. The operation previously described is modified, however, when a signal is introduced to the windings 42 and 44 from the signal source 46, since the purpose of the magnetic amplifier is to amplify such signals.

When the signal source 46 has a more positive voltage at its lower terminal than at its upper terminal, current flows downwardly through the winding 44 in Figure 1 and upwardly through the winding 42. This current produces a flux in the core 40 in the same direction as the flux produced by the line current through the winding 22 when the line current flows downwardly through the winding. However, the flux produced in the core 38 by the signal current from the source 46 is in opposition to the flux produced in the core by the line current from the source 10. This causes the core 40 to receive more volt-seconds than the core 38 and to become saturated before the core 38.

During the time that all of the cores 24, 26, 38 and 40 are unsaturated, the voltage across the windings 16 and 18 is of the same order of magnitude as the voltage across the windings 20 and 22. This is shown by the curve portion 102 in Figure 4C for the voltage across the windings 16 and 18 and by the curve portion 104 in Figure 4B for the voltage across the windings 20 and 22. It results in part from the fact that the resistances 12 and 14 are of the same order of magnitude. It also results in part from the fact that the signal from the source 46 appears across the windings 34 and 36 in a manner similar to its appearance across the windings 48 and 50. As will be seen, the voltage produced by the signal source 46 across the windings 36 and 50 is in a direction to aid the flux produced in the cores 26 and 40 by the line voltage. The voltage produced by the source 46 across the windings 34 and 48 is in a direction to oppose the flux resulting from the line current.

The instantaneous voltage relationships in the different line windings for an unsaturated state of the cores 24, 26, 38 and 40 can be expressed by the following four linear equations when there are substantially equal turns ratios between the various windings in the switching amplifier and the corresponding windings in the main amplifier:

$$e_1+e_2+e_3+e_4=e_L \quad (1)$$

$$-e_1+e_2=e_s \quad (2)$$

$$e_3-e_4=e_s \quad (3)$$

where $$\frac{e_1+e_2}{e_3+e_4}=\frac{\text{resistance 12}}{\text{resistance 14}} \quad (4)$$

$e_1$=the voltage across the winding 16;
$e_2$=the voltage across the winding 18;
$e_3$=the voltage across the winding 20;
$e_4$=the voltage across the winding 22;
$e_L$=the line voltage from the source 10; and
$e_s$=the signal voltage from the source 46.

After positive volt-seconds have been applied to the cores for some time, the core 26 becomes saturated and the impedance of the winding 36 becomes relatively low. The core 26 becomes saturated first for the same reasons as disclosed above for the case where no signal voltage is produced by the source 46. However, the core 26 becomes saturated at an earlier time in the half cycle than in the case where no signal voltage is produced by the source 46. This results from the action of the signal source 46 in changing the voltage relationships across the different line windings so as to produce an increase in the volt-seconds applied to the core 26 above that ordinarily received by the core from the line source 10.

Upon the saturation of the core 26, the voltage across the winding 16 drops to a negligible value in a manner similar to that disclosed above. The voltage drops to a negligible value provided that the signal voltage from the source 46 has disappeared. If a signal is still being produced by the source 46, the voltage across the winding 16 actually drops to a negative value. This may be seen by making $e_2=0$ in the above equations and solving the equations for $e_1$ since Equation 4 is no longer valid. As will be seen from Equation 2, $e_1$ then equals $-e_s$. The voltage produced across the winding 16 is illustrated at 106 in Figure 4C for the situation where the source 46 is still producing a signal voltage after the core 26 has become saturated.

The solution of the above equation for the situation where $e_2=0$ indicates that $$e_3=\frac{e_L}{2} \quad (5)$$

$$e_4=\frac{e_L}{2}+e_s \quad (6)$$

The total voltage across the windings 20 and 22 is $e_L+e_S$, as illustrated at 108 in Figure 4B. As will be seen from Equations 5 and 6, the core 40 is receiving a greater number of volt-seconds than the core 38 after the saturation of the core 26. Furthermore, the core 40 had received a greater amount of volt-seconds than the core 38 before the saturation of any core because of the differential action produced by the windings 42 and 44 on the voltage from the signal source 46. This causes the core 40 to become saturated before the core 38.

When the core 40 becomes saturated, the impedance presented to the winding 22 becomes relatively low and the voltage across the winding becomes negligible. Since the cores 24 and 38 are now the only cores remaining unsaturated, approximately half of the voltage from the source 10 is impressed across the winding 16 and the other half is impressed across the winding 20. These voltages are respectively illustrated at 110 and 112 in Figures 4C and 4B.

During the time that the cores 26 and 40 are saturated, current flows through a circuit including the winding 34, the dummy load 52, the diodes 54 and 58 and the diodes 56 and 60 and the winding 36. This current is relatively large since the impedance presented by the dummy load 52, the diodes and the winding 36 is relatively low. Because of this current, the voltage on the plate of the diode 58 is substantially equal to the voltage on the plate of the diode 60. This results from the fact that the voltage drops across the diodes 54 and 56 are essentially equal.

Since the plates of the diodes 58 and 60 have substantially equal voltages, the impedance between these members must be relatively low. This causes the voltage generated across the winding 48 to produce a flow of current through a circuit including the diode 58, the winding 36, the winding 34, the dummy load 52, the diode 56, the load 62, the winding 50 and the winding 48. This current produces an output voltage across the load 62, as illustrated at 114 in Figure 4D.

After the core 40 has become saturated, volt-seconds are still applied to the core 38 since approximately half of the line voltage from the source 10 is impressed across the winding 20 during this time. This causes the core 38 to become saturated some time after the saturation of the core 40. Upon the saturation of the cores 38 and 40, the voltage across the windings 20 and 22 becomes negligible, as illustrated at 116 in Figure 4B. This causes the full voltage from the source 10 to be impressed across the winding 16, as illustrated at 118 in Figure 4C. The core 24 cannot become saturated at any time during the positive half cycle of line voltage for the same reasons as disclosed above for the case where no signal is produced by the source 46.

In the next half cycle of line voltage, the core 24 becomes saturated before the core 26 in a manner similar to that disclosed above. Furthermore, the core 38 becomes saturated before the core 40 because of the differential volt-seconds introduced to the cores from the source 46 assuming voltage from the source 46 remains the same polarity. When the cores 24 and 38 become saturated, currents flow through the dummy load 52 and the load 62 in a manner similar to that disclosed above. This results from the induction of more positive voltages at the lower terminals of the windings 36 and 50 than at the upper terminals of the windings. The current flows through the load 62 until the core 40 becomes saturated.

It will thus be seen that an output pulse is produced across the load 62 in each half cycle of line voltage when a positive signal is produced on the lower terminal of the source 46 relative to the voltage on the upper terminal of the source. It can be further shown by a discussion similar to the above that an output voltage of opposite polarity is produced across the load 62 in each half cycle of line voltage when the signal voltage is more positive at the upper terminal of the source 46 than at the lower terminal of the source. Thus, an output pulse is produced in each and every half cycle of line voltage when any signal is produced by the source 46. And, the polarity and amplitude of the output pulse is determined by the polarity and amplitude of the input pulse during the same half cycle.

Figure 4:
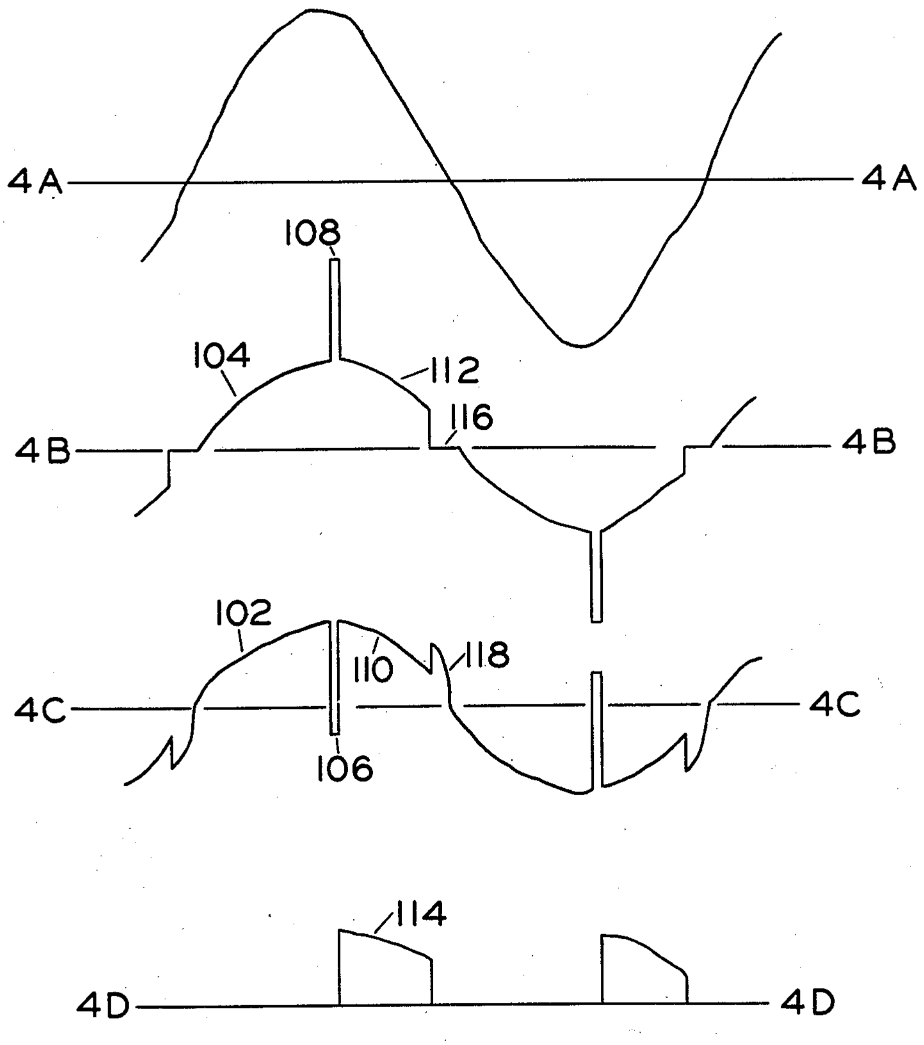
Figure 5:
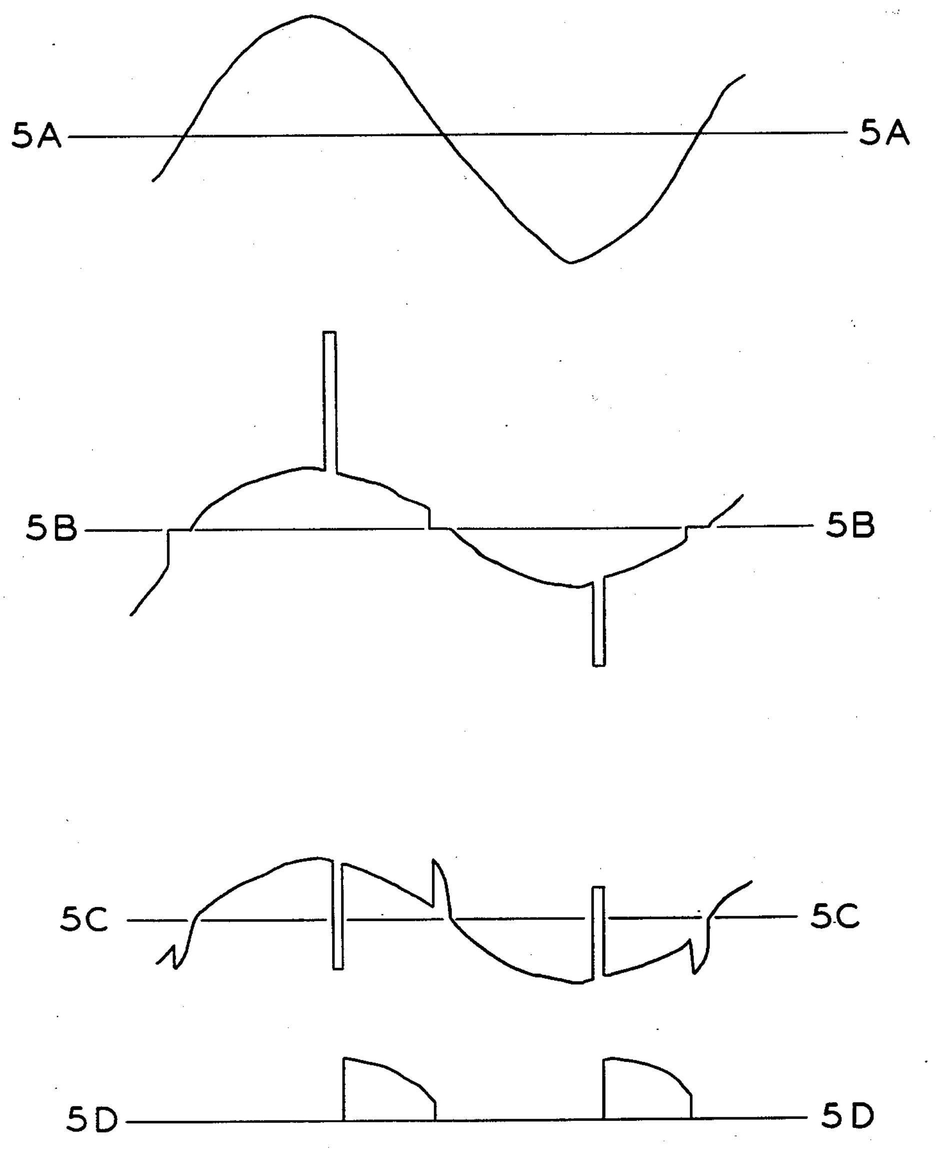

The curves shown in Figure 4 relate to the situation where a relatively high voltage, such as 130 volts, is produced by the source 10 and a relatively large signal voltage is produced by the source 46. The curves shown in Figure 5 illustrate the case where a low line voltage such as 100 volts is produced by the source 10 and a large signal is produced by the source 46. As will be seen, the curves shown in Figure 5 are similar to the curves shown in Figure 4, except that the relative times at which various cores become saturated may be somewhat different because of the difference in line voltage.

It is desirable that one of the cores 24 and 26 saturate before either or both of the cores 38 and 40. In order to insure this sequence, the resistances 12 and 14 are respectively connected across the windings 16 and 18 and across the windings 20 and 22. The resistance 12 is also provided with a slightly greater value than the resistance 14 so that the cores 24 and 26 will receive slightly more volt-seconds than the cores 38 and 40 during the time at the beginning of each voltage half cycle in which all of the cores are unsaturated.

It has been shown that current flows through the windings 34 and 36 and the dummy load 52 towards the end of each half cycle of line voltage whether a low or a high voltage is applied to the magnetic amplifier from the source 10. It has been further shown that current flows through the windings 34 and 36 and the dummy load 52 in each half cycle of line voltage whether or not a signal voltage is applied to the magnetic amplifier from the source 46 and whether the signal voltage is of one polarity or the other. This current produces in the core 24 or the core 26 a change in the volt-second level equivalent to that produced in the cores by the flow of current from the battery 32 through the windings 30 and 28, but of opposite polarity. However, as has been previously disclosed, the Barkhausen effect has the same action as the battery 32. Therefore, the battery 32, the rheostat 33, and the windings 28 and 30 on switching amplifier cores 24 and 26 do not have to be included in the amplifier.

The apparatus disclosed above has several important advantages. It provides a relatively strong output pulse during each and every half cycle of line voltage and during the same half cycle of line voltage in which a signal voltage is introduced to the amplifier. The amplifier produces in successive half cycles output pulses corresponding in amplitude and polarity to the amplitude and polarity of the signal voltage. Furthermore, such output pulses are completely independent of input signals (source 46) and output pulses occurring any prior half cycle.

The amplifier also has the advantage that it operates efficiently such that excessive currents are never drawn from the line source 10 even with considerable variations in the line voltage from the source 10. For example, with the values disclosed for the different components at the beginning of the specification, the line voltage may vary between 100 and 130 volts without materially affecting the operation of the amplifier.

Since variations in voltage are equivalent to variations in frequency in determining the total volt-seconds during each half cycle of line voltage, it should be appreciated that the amplifier will also operate reliably with considerable variation in the frequency of the line voltage. Furthermore, it is believed that a person skilled in the art would understand from the above dsclosure how to adjust the circuit parameters so that the amplifier operates efficiently with even greater swings in voltage than 100 to 130 volts.

Since the magnetic amplifier disclosed above is capable of producing large output signals, it can be used as the last stage in a sequency of cascaded stages. Prior stages in such a cascaded arrangement may be similar to those disclosed in co-pending application Serial No. 412,796, filed February 26, 1954, by Joseph A. Fingerett and Frank A. Hill. The magnetic amplifier disclosed above is especially adapted to be used as the last stage in a cascaded arrangement because of its delivery of output power towards the end of each half cycle of line voltage. Since each stage provides some delay between the time that it receives an input signal and delivers an output signal, stages prior to the last stage will have time in each half cycle to operate properly when the last stage in the cascaded arrangement delivers an output signal towards the end of each half cycle of line voltage.

As may be seen from the above disclosure, the amplitude of the output signal is dependent upon the amplitude of the input signal. This may be seen from the fact that the current flowing through the load 62 is dependent upon the voltages across the windings 48 and 50, and the voltages induced in the windings 48 and 50 are dependent upon the amplitude of the signals applied to the windings 42 and 44.

The relative time at which the output signal is produced in each half cycle is dependent upon the current flowing through the dummy load 52 and the windings 34 and 36. As disclosed previously, this current controls the relative time in each half cycle in which one of the cores 24 and 26 becomes saturated. Since the cores 38 and 40 cannot generally become saturated until one of the cores 24 and 26 becomes saturated, an output pulse cannot be delivered in each half cycle until after one of the cores 24 and 26 has become saturated. In this way, the relative timing—in other words, the phase—of the output signal can be controlled by adjusting the amplitude of the signal applied to the windings 28 and 30. The signal applied to the windings 28 and 30 may be adjusted in amplitude by varying the positioning of the movable contact on the rheostat 33 so as to change the effective resistance in the circuit.

Since both the phase and the amplitude of the output signal can be controlled, the magnetic amplifier disclosed above can be used to accurately control the operation of certain devices such as motors. The operation of the motor can thus be varied by adjusting the phase and the amplitude of the output signal.

We claim:

1. A magnetic power amplifier, including, a first pair of saturable cores, a second pair of saturable cores, cyclically operable means including means simultaneously exposing said cores to flux produced by an alternating line current for alternately saturating both of the cores in the first pair initially in one direction and then in the opposite direction and for alternately saturating one of the cores in the second pair, means for effecting a temporal separation of the saturation of the cores in the first pair including means for exposing the cores to flux produced by a signal current, a load, and means including the load for operating in synchronism with the saturation of at least one of the cores in the first pair to control the delivery of output current from the amplifier within successive half cycles and to control the delivery of current to the second pair of cores for the production of flux in the second pair of cores in a direction to prevent one of the cores from saturating.

2. A magnetic power amplifier, including, a first pair of saturable cores, a second pair of saturable cores cyclically operable means including means simultaneously exposing the cores to flux produced by an alternating line current for alternately saturating both of the cores in the first pair initially in one direction and then in the opposite direction and for alternately saturating one of the cores in the second pair, means for producing a saturation of one of the cores in the first pair before a saturation of the other core in the first pair including means for exposing the cores to flux produced by a signal current, a first load, circuit means including the first load for producing flux in the second pair of cores upon the saturation of one of the cores in the second pair and the saturation of at least one of the cores in the first pair to stabilize the operation of the second pair of cores in preventing one of the cores in the pair from ever saturating, a second load, and circuit means including the second load for providing for the delivery of output current to the load upon the saturation of one of the cores in the first pair and in the second pair and until the saturation of the second core in the first pair.

3. A magnetic power amplifier, including, a first pair of saturable cores, a second pair of saturable cores, cyclically operable means including means for simultaneously exposing the cores to flux of the same polarity and for alternately saturating both of the cores in the first pair initially in one direction and then in the opposite direction and for alternately saturating one of the cores in the second pair, signal means for differentially producing flux in each pair of cores to provide a saturation of one of the cores in each pair before any saturation of the other core in the pair, a first load, circuit means including the first load for differentially producing flux in the second pair of cores relative to the fluxes produced in the cores by the cyclically operable means, upon the saturation of one of the cores in the second pair and the saturation at least one of the cores in the first pair, to stabilize the operation of the second pair of cores in preventing one of the cores in the pair from ever saturating, a second load, and circuit means including the second load and the first circuit means for providing a relatively low impedance to the load upon the saturation of one of the cores in the first pair and in the second pair for the delivery of output current through the load until the saturation of the second core in the first pair.

4. A magnetic power amplifier, including, a first pair of saturable cores, a second pair of saturable cores, a first pair of line windings each being magnetically associated with a different one of the cores in the first pair, a second pair of line windings each being magnetically associated with a different one of the cores in the second pair, a first pair of output windings each being magnetically associated with a different one of the cores in the first pair, a second pair of output windings each being magnetically associated with a different one of the cores in the second pair, means for introducing cyclic line voltage to each of the line windings, means for introducing signals of opposite polarities to the line windings in the first pair relative to the polarities of the cycic line voltages introduced to the windings to produce a saturation of one of the cores in the pair before the saturation of the other core in the pair, a first load, unidirectional means, an output circuit including the load, the unidirectional means and the output windings in the first and second pairs for delivering an output current to the load upon the saturation of one of the cores in each of the first and second pairs and until the saturation of the second core in the first pair, a second load, and a control circuit including the second load, the unidirectional means and the second pair of output windings for introducing signals of opposite polarities to the second pair of output windings upon the saturation of at least one of the cores in each of the first and second pairs to prevent one of the cores in the second pair from ever saturating.

5. A magnetic power amplifier, including, a first pair of saturable cores, a first pair of line windings each being magnetically associated with a different core in the first pair, a first pair of output windings each being magnetically associated with a different core in the first pair, a second pair of saturable cores, a second pair of line windings each being magnetically associated with a different core in the second pair, a second pair of output windings each being magnetically associated with a different core in the second pair, means for providing for the introduction of line voltage to the line windings in each pair, means for introducing signal energy differentially to the line windings in each pair relative to the introduction of line voltage to the windings to produce a saturation of one of the cores in each pair before the other core in the pair during successive half cycles of line voltage, a control circuit connected to the first pair of output windings to produce energy in the output windings upon the introduction of line voltage to the line windings for the prevention of one of the windings in the pair from ever becoming saturated even with considerable variations in line voltage and upon the introduction or lack of introduction of signal energy, and an output circuit including the control circuit and connected to the second pair of output windings to produce power amplification of the signal energy upon the saturation of one of the cores in each pair and until the saturation of the other core in the second pair.

6. A magnetic power amplifier, including, a plurality of saturable cores, a plurality of line windings each being magnetically associated with a different one of the cores, means for providing for the introduction of line voltage to the line windings, means for introducing signal energy differentially to pairs of cores in the plurality relative to the introduction of line voltage to the associated line windings to produce a temporal separation of the core saturations in each pair during each half cycle of line voltage, and an output circuit associated with the different line windings and with the signal means to provide an amplification of power in the output circuit during the temporal separation of the core saturations in each pair for each half cycle of line voltage and to prevent one of the cores in a particular pair from ever saturating during each half cycle.

7. A magnetic power amplifier, including, a plurality of saturable cores, a plurality of line windings each being magnetically associated with a different core, means for providing for the introduction of line voltage to the line windings, means for introducing signal energy differentially to pairs of line windings in the plurality relative to the introduction of line voltage to the line windings to produce a temporal separation of the core saturations in each pair in successive half cycles of line voltage, and an output circuit associated with the line windings and with the signal means to produce an output signal during each temporal separation in core saturations of the pairs and upon the introduction of energy from the signal means, the output circuit also being associated with the line windings to introduce energy to the cores in a particular pair, upon the introduction or lack of introduction of signal energy, to prevent the core from ever becoming saturated during each half cycle.

8. A magnetic power amplifier, including, a plurality of saturable cores, a plurality of line windings each being magnetically associated with a different one of the cores, means for providing for the introduction of cyclic line voltage to the line windings, means for introducing signal energy in opposite polarities to pairs of line windings relative to the introduction of line voltage to the windings to produce a saturation of one of the cores in each pair before any saturation of the other core in each pair, an output circuit associated with the line windings and with the signal means to provide a low impedance upon the saturation of one of the cores in each pair for the delivery of an output current until the saturation of the other core in a first particular pair, and means in the output circuit for introducing voltages from the line voltage means and the signal means to a second particular pair of cores upon the saturation of at least one of the cores in each pair to prevent one of the cores in the second particular pair from ever saturating.

9. A magnetic power amplifier, including, a first pair of saturable cores, a first pair of line windings each being magnetically associated with a different core in the first pair, a first pair of output windings each being magnetically associated with a different core in the first pair, a second pair of saturable cores, a second pair of line windings each being magnetically associated with a different core in the second pair, a second pair of output windngs each being magnetically associated with a different core in the second pair, means for providing for the introduction of voltage to the line windings in each pair, means for introducing signal energy differentially to each pair of line windings relative to the introduction of line voltage to the windings to produce a temporal separation of the core saturations in each pair during successive half cycles of line voltage, a control circuit including the first pair of output windings for preventing one of the windings in the pair from ever saturating during each half cycle, and an output circuit including the first and second pairs of output windings for producing power amplification of the signal energy during the temporal separation of the core saturations in the second pair.

10. A magnetic power amplifier, including, a first pair of saturable cores, a second pair of saturable cores, a first pair of line windings each being magnetically associated with a different one of the cores in the first pair, a first pair of input windings each being magnetically associated with a different one of the cores in the first pair, a first pair of output windings each being magnetically associated with a different one of the cores in the first pair, a second pair of line windings each being magnetically associated with a different one of the cores in the second pair, means for introducing cyclic line voltage to each of the line windings, means for introducing signals of opposite polarities to the input windings in the first pair relative to the introduction of line voltage to the windings to produce a saturation of one of the cores in the pair before the saturation of the other core in the pair, a first load, unidirectional means, a control circuit including the load, the unidirectional means and the second pair of output windings for introducing signals of opposite polarities to the windings in the pair upon the saturation of at least one of the cores in the first and second pairs to prevent one of the cores in the second pair from ever saturating, a second load, and an output circuit including the unidirectional means, the first and second loads and the first and second pairs of output windings for producing an output current upon the saturation of one of the cores in each of the first and second pairs and until the saturation of the second core in the first pair.

11. A magnetic power amplifier, including, a first pair of saturable cores, a second pair of saturable cores, a first pair of line windings each being magnetically associated with a different one of the cores in the first pair, a second pair of line windings each being magnetically associated with a different one of the cores in the second pair, means for introducing cyclic line voltage to each of the line windings in the first and second pairs to produce a magnetic flux in each associated core, a load associated with the line windings for producing an output signal during the saturation of one of the cores in each pair and until the saturation of the other core in the second pair, means for producing a separation in the time at which the cores in the first pair become saturated in each half cycle of line voltage and for controlling the amplitude of the output signal produced across the load, said last mentioned means including means for introducing a signal voltage to the line windings in the first pair to produce in one of the associated cores in the pair a magnetic flux aiding the magnetic flux resulting from the line current and to produce in the other associated core in the pair a magnetic flux opposing the magnetic flux resulting from the line current, and means for controlling the relative time at which the output signal is produced in each half cycle of line voltage, the last mentioned means including means for introducing a control voltage to the line windings in the second pair to produce in one of the associated cores in the pair a magnetic flux aiding the magnetic flux resulting from the line current and to produce in the other associated core in the pair a magnetic flux opposing the magnetic flux resulting from the line current.

12. A magnetic power amplifier, including, a first pair of saturable cores, a second pair of saturable cores, cyclically operable means including means simultaneously exposing the cores to flux produced by an alternating line current for alternately saturating both of the cores in the first pair initially in one direction and then in the opposite direction and for alternately saturating one of the cores in the second pair, a load associated with the first pair of cores for producing an output signal during the saturation of one of the cores in the first and second pairs and until the saturation of the second core in the first pair, means for producing a saturation of one of the cores in the first pair before a saturation of the other core in the first pair and for controlling the amplitude of the output signal produced across the load, the last mentioned means including means for introducing a signal to the first pair of cores to produce magnetic fluxes in the cores, and means for introducing a signal to the second pair of cores to control the phase of the output signal produced across the load during each half cycle of line voltage.

13. A magnetic power amplifier, including, a first pair of saturable cores, a second pair of saturable cores, a first pair of line windings each being magnetically associated with a different core in the first pair, a second pair of line windings each being magnetically associated with a different core in the second pair, a first pair of output windings each being magnetically associated with a different core in the first pair, a second pair of output windings each being magnetically associated with a different core in the second pair, means for introducing line voltage to the line windings in each pair to produce magnetic fluxes in the windings, an output circuit including the first and second pairs of output windings for producing power amplification of a signal in each half cycle of line voltage upon the saturation of one of the cores in the first pair and in the second pair and until the saturation of the other core in the second pair, means for introducing signal energy differentially to the line windings in the first pair relative to the introduction of the line voltage to the windings to produce a temporal separation in the saturation of the cores in the first pair for the production of an output signal and to control the amplitude of the output signal, means for differentially introducing a voltage to the line windings in the second pair relative to the introduction of line voltage to the windings to control the relative time in each half cycle at which the output pulse is produced.

14. A magnetic power amplifier, including a first pair of saturable cores, a second pair of saturable cores, a first pair of line windings magnetically coupled to the first pair of cores, a second pair of line windings magnetically coupled to the second pair of cores, the line windings in the first and second pairs being connected in series, means for introducing alternating line voltage to the series circuit formed by the line windings, a first pair of output windings magnetically coupled to the first pair of cores, a second pair of output windings magnetically coupled to the second pair of cores, means for introducing signal energy differentially to the cores in each pair to produce a temporal separation of the core saturations in each pair in each half cycle of line voltage, a first load, a second load, and unidirectional means, the output windings in each pair forming an output circuit with the first and second loads and the unidirectional means for delivering an output current to the loads upon the saturation of one of the cores in each pair and until a saturation of the other core in the first pair, the output windings in the second pair forming a control circuit with the unidirectional means and the second load for delivering a current to one of the windings in the pair, upon a saturation in each half cycle of the core associated with the other winding in the pair, to prevent the core associated with the first winding in the pair from saturating.

15. A magnetic amplifier as set forth in claim 14 in which the unidirectional means forms a bridge having first and second pairs of opposite terminals and in which the first pair of output windings is connected between the first pair of terminals in the bridge and in which the second pair of output windings are connected between the second pair of terminals in the bridge.

16. A magnetic amplifier as set forth in claim 14 in which a first resistance is connected across the first pair of line windings and a second resistance is connected across the second pair of line windings and the first and second resistances are provided with values to produce a saturation of one of the cores in the second pair before any saturation of either of the cores in the first pair in each half cycle of line voltage.

17. A magnetic amplifier as set forth in claim 5 in which means are provided to control the relative amplitudes of the line voltage introduced to the first and second pairs of windings for the saturation of one of the cores in the first pair before any saturation of either core in the second pair during successive half cycles of line voltage.

18. A magnetic amplifier, including, a first pair of saturable cores, a second pair of saturable cores, a first pair of line windings wound on the first pair of cores, a second pair of line windings wound on the second pair of cores, a first pair of output windings wound on the first pair of cores, a second pair of output windings wound on the second pair of cores, means for connecting the line windings in the first and second pairs in series and for introducing cyclic line voltage to the series circuit formed by the windings, means for introducing signal energy differentially to the cores in each pair to produce a saturation of one of the cores in each pair before any saturation of the other core in the pair during successive half cycles of line voltage, a first load, a second load, and a plurality of unidirectional means connected in a bridge having first and second oppositely disposed terminals and third and fourth oppositely disposed terminals, the windings in the first pair being connected differentially in series with each other and in series with the first load across the first and second bridge terminals to produce a current through the windings for preventing one of the cores in the first pair from saturating in each half cycle of line voltage, the windings in the first and second pairs being differentially connected in series with the first and second loads across the third and fourth bridge terminals to produce a power amplification of the signal energy in the second load upon the saturation of one of the cores in each pair and until a saturation of the second core in the second pair during successive half cycles of line voltage.

19. A magnetic amplifier as set forth in claim 18 in which a pair of input windings are wound on the second pair of cores and are differentially connected to receive input signals for introducing signal energy differentially to the cores.

No references cited